United States Patent
Santra et al.

(10) Patent No.: US 7,438,758 B2
(45) Date of Patent: Oct. 21, 2008

(54) CEMENT COMPOSITIONS COMPRISING AROMATIC SULFONATED POLYMERS AND METHODS OF USING THE SAME

(75) Inventors: Ashok K. Santra, Duncan, OK (US); B. Raghava Reddy, Duncan, OK (US); Russell M. Fitzgerald, Waurika, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/780,192

(22) Filed: Jul. 19, 2007

(65) Prior Publication Data

US 2008/0011202 A1    Jan. 17, 2008

Related U.S. Application Data

(62) Division of application No. 10/966,937, filed on Oct. 15, 2004, now Pat. No. 7,290,613.

(51) Int. Cl.
*C04B 24/20* (2006.01)

(52) U.S. Cl. .................. 106/724; 106/726; 106/823; 524/2

(58) Field of Classification Search ............... 106/724, 106/726, 823; 524/2
See application file for complete search history.

(56) References Cited

U.S. PATENT DOCUMENTS

| | | | |
|---|---|---|---|
| 3,954,677 A | * | 5/1976 | Law |
| 4,125,410 A | * | 11/1978 | Natsuume |
| 4,164,426 A | | 8/1979 | Sinka et al. |
| 4,239,550 A | * | 12/1980 | Kohler |
| 4,469,518 A | | 9/1984 | McKenzie |
| 4,515,635 A | | 5/1985 | Rao et al. |

(Continued)

FOREIGN PATENT DOCUMENTS

EP    0430644 A1    6/1991

(Continued)

OTHER PUBLICATIONS

Answer 3 of 3 of CA on STN JP 02296804 (Dec. 7, 1990) Kanemori et al. abstract only.*

(Continued)

*Primary Examiner*—Paul Marcantoni
(74) *Attorney, Agent, or Firm*—Craig W. Roddy; Conley Rose, P.C.

(57) ABSTRACT

A method of servicing a wellbore that penetrates a subterranean formation includes displacing a cement composition comprising an aromatic sulfonated polymer into the wellbore and allowing the cement composition to set. In an embodiment, a transition time of the cement composition is less than or equal to about 60 minutes, alternatively less than or equal to about 50 minutes, less than or equal to about 40 minutes, less than or equal to about 30 minutes, less than or equal to about 20 minutes, or less than or equal to about 10 minutes. Thus, the transition time may be short enough to inhibit a substantial amount of gas migration into the cement composition before it sets. In yet another embodiment, the cement composition exhibits a viscosity that increases from a value of 35 Bc (Bearden units) to about 100 Bc in about 10 minutes or less when the cement composition sets.

20 Claims, 1 Drawing Sheet

U.S. PATENT DOCUMENTS

| | | | |
|---|---|---|---|
| 4,555,269 | A | 11/1985 | Rao et al. |
| 4,601,758 | A * | 7/1986 | Nelson ................ 523/130 |
| 4,657,948 | A | 4/1987 | Roark et al. |
| 4,684,674 | A | 8/1987 | Brooks |
| 4,746,367 | A | 5/1988 | Meyer |
| 4,978,392 | A | 12/1990 | Kilbarger et al. |
| 5,049,446 | A | 9/1991 | Blackwell et al. |
| 5,339,903 | A | 8/1994 | Eoff et al. |
| 5,346,012 | A | 9/1994 | Heathman et al. |
| 5,348,582 | A * | 9/1994 | Herzig et al. |
| 5,484,019 | A | 1/1996 | Griffith |
| 5,494,516 | A | 2/1996 | Drs et al. |
| 5,571,318 | A | 11/1996 | Griffith et al. |
| 5,588,488 | A | 12/1996 | Vijn et al. |
| 5,609,681 | A | 3/1997 | Drs et al. |
| 5,806,594 | A | 9/1998 | Stiles et al. |
| 5,913,364 | A | 6/1999 | Sweatman |
| 6,019,835 | A | 2/2000 | Chatterji et al. |
| 6,089,318 | A | 7/2000 | Laramay et al. |
| 6,167,967 | B1 | 1/2001 | Sweatman |
| 6,244,343 | B1 | 6/2001 | Brothers et al. |
| 6,258,757 | B1 | 7/2001 | Sweatman et al. |
| 6,268,406 | B1 | 7/2001 | Chatterji et al. |
| 6,273,191 | B1 | 8/2001 | Reddy et al. |
| 6,336,505 | B1 | 1/2002 | Reddy |
| 6,454,004 | B2 | 9/2002 | Reddy et al. |
| 6,457,524 | B1 | 10/2002 | Roddy |
| 6,497,283 | B1 | 12/2002 | Eoff et al. |
| 6,630,021 | B2 | 10/2003 | Reddy et al. |
| 6,715,552 | B2 | 4/2004 | Eoff et al. |
| 6,739,806 | B1 | 5/2004 | Szymanski et al. |
| 6,743,288 | B2 | 6/2004 | Eoff et al. |
| 6,793,730 | B2 | 9/2004 | Reddy et al. |
| 6,978,835 | B1 | 12/2005 | Reddy et al. |
| 7,004,256 | B1 | 2/2006 | Chatterji et al. |
| 7,021,380 | B2 | 4/2006 | Caveny et al. |
| 7,073,585 | B2 | 7/2006 | Morgan et al. |
| 7,244,303 | B2 | 7/2007 | Chatterji et al. |
| 2006/0081373 | A1 | 4/2006 | Santra et al. |
| 2007/0209796 | A1 | 9/2007 | Santra et al. |

FOREIGN PATENT DOCUMENTS

| | | |
|---|---|---|
| GB | 1588130 | 4/1981 |

OTHER PUBLICATIONS

Answer 1 of 2 of CA on STN JP 08299777 (Nov. 19, 1996) Kiuchi et al. abstract only.*

Notice of Allowance from U.S. Appl. No. 10/966,937 dated Sep. 11, 2007.

Halliburton brochure entitled "Diacel LWL Cement Retarder/Fluid-Loss Additive" dated 1999, 2 pgs.

Halliburton brochure entitled "GasStop HT Cement Additive" dated 1999, 2 pgs.

Halliburton brochure entitled "Halad®-344 Fluid-Loss Additive" dated 1998, 2 pgs.

Halliburton brochure entitled "Halad®-413 Fluid-Loss Additive" dated 1998, 2 pgs.

Halliburton brochure entitled "HR®-25 Cement Retarder" dated 1999, 2 pgs.

Halliburton brochure entitled "HR®-5 Cement Additive" dated 1998, 2 pgs.

Halliburton brochure entitled "Microsand Cement Additive" dated 1999, 2 pgs.

Halliburton brochure entitled "Silicalite Cement Additive" dated 1999, 2 pgs.

Halliburton brochure entitled "SSA-1 Strength-Stabilizing Agent" dated 1998, 2 pgs.

Halliburton brochure entitled "SSA-2 Coarse Silica Flour" dated 1999, 2 pgs.

AllRefer.com reference, "Sulfonic Acid, Organic Chemistry," Apr. 20, 2004, 3 pgs., http:/reference.allrefer.com/encyclopedia/S/sulfonic.html, The Columbia Electronic Encyclopedia, 2003, Columbia University Press.

Foreign communication from a related counterpart application—International Search Report and Written Opinion, PCT/GB2005/003780, Dec. 14, 2005, 9 pgs.

Office Action dated Jan. 18, 2007 (14 pages) for U.S. Appl. No. 10/966,937, filed Oct. 15, 2004.

Office Action dated Mar. 21, 2007 (16 pages) for U.S. Appl. No. 11/372,001, filed Mar. 9, 2006.

Notice Of Allowance dated May 24, 2007 (4 pages) for U.S. Appl. No. 10/966,937.

Notice of Allowance dated Jul. 31, 2007 (4 pages) for U.S. Appl. No. 11/372,001.

Notice of Allowance dated Sep. 11, 2007 (8 pages) for U.S. Appl. No. 10/966,937.

Notice Of Allowance dated Nov. 15, 2007 (6 pages), for U.S. Appl. No. 11/372,001, filed Mar. 9, 2006.

Office Action dated Mar. 17, 2008 (13 pages), U.S. Appl. No. 11/947,454, filed Nov. 29, 2007.

Brothers, Lance E., et al., "Synthetic retarder for high-strength cement," SPE/IADC 21976, 1991, pp. 659-665, SPE/IADC Drilling Conference.

Chatterji, J., et al., "Development of a set retarder for foamed cement applications," SPE 80244, 2003, pp. 1-5, Society of Petroleum Engineers Inc.

Christian, W. W., et al., "Gas leakage in primary cementing—a field study and laboratory investigation," Journal of Petroleum Technology, Nov. 19976, pp. 1361-1369, American Institute of Mining, Metallurgical, and Petroleum Engineers, Inc.

* cited by examiner

CEMENT COMPOSITIONS COMPRISING AROMATIC SULFONATED POLYMERS AND METHODS OF USING THE SAME

CROSS-REFERENCE TO RELATED APPLICATIONS

This is a Divisional Application of U.S. patent application Ser. No. 10/966,937, filed Oct. 15, 2004 and entitled "Cement Compositions Comprising Aromatic Sulfonated Polymers and Methods of Using the Same," which is hereby incorporated by reference herein in its entirety.

FIELD OF THE INVENTION

The present invention generally relates to well cementing, and more particularly to cement compositions comprising aromatic sulfonated polymers for reducing a transition time of the compositions and methods of cementing a wellbore using such cement compositions.

BACKGROUND OF THE INVENTION

Zonal isolation refers to the isolation of a subterranean formation or zone, which serves as a source of a natural resource such as gas, oil, or water, from other subterranean formations. To achieve isolation of a subterranean formation, a well bore is typically drilled down to the subterranean formation while circulating a drilling fluid through the wellbore. After the drilling is terminated, a string of pipe, e.g., casing, is run in the wellbore. Next, primary cementing is typically performed whereby a cement slurry is placed in the annulus and permitted to set into a hard mass, thereby attaching the string of pipe to the walls of the wellbore and sealing the annulus. Subsequent secondary cementing operations such as squeeze cementing may also be performed.

One problem commonly encountered during the placement of a cement slurry in a wellbore is unwanted gas migration from the subterranean zone into and through the cement slurry. Gas migration is caused by the behavior of the cement slurry during a transition phase in which the cement slurry changes from a true hydraulic fluid to a highly viscous mass showing some solid characteristics. When first placed in the annulus, the cement slurry acts as a true liquid and thus transmits hydrostatic pressure. However, during the transition phase, certain events occur that cause the cement slurry to lose its ability to transmit hydrostatic pressure. One of those events is the loss of fluid from the slurry to the subterranean zone. Another event is the development of static gel strength, i.e., stiffness, in the slurry. As a result, the pressure exerted on the formation by the cement slurry falls below the pressure of the gas in the formation such that the gas begins to migrate into and through the cement slurry. When gas migration begins, the cement slurry typically has a gel strength of about 100 lb$_f$/100 ft$^2$. The gas migration causes flow channels to form in the cement slurry. Eventually the gel strength of the cement slurry increases to a value sufficient to resist the pressure exerted by the gas in the formation against the slurry. At this point, the cement slurry typically has a gel strength of about 500 lb$_f$/100 ft$^2$. The cement slurry then sets into a solid mass.

Unfortunately, the flow channels formed in the cement during such gas migration remain in the cement once it has set. Those flow channels can permit further migration of gas through the cement even long after the cement is set. Thus, the cement residing in the annulus may be ineffective at maintaining the isolation of the adjacent subterranean formation.

To overcome this problem, attempts have been made to design a cement slurry having a shorter transition time, i.e., the period of time during which gas migration into the slurry can occur, which is typically the time ranging from when the gel strength of the slurry is about 100 lb$_f$/100 ft$^2$ (pound force per hundred square foot) to when it is about 500 lb$_f$/100 ft$^2$. While cement slurries having shorter transition times have been developed, those slurries are typically very expensive to prepare. Further, their transition times are still longer than desired.

As such, there continues to be a need for improved methods of eliminating gas migration during well cementing to reduce the risk of compromising zonal isolation. It is therefore desirable to develop relatively inexpensive cement compositions having even shorter transition times.

SUMMARY OF THE INVENTION

A method of servicing a wellbore that penetrates a subterranean formation includes displacing a cement composition comprising an aromatic sulfonated polymer into the wellbore and allowing the cement composition to set. In embodiments, a transition time of the cement composition is less than or equal to about 60 minutes, less than or equal to about 50 minutes, less than or equal to about 40 minutes, less than or equal to about 30 minutes, less than or equal to about 20 minutes, or less than or equal to about 10 min. As such, the transition time may be short enough to inhibit a substantial amount of gas migration into the cement composition before it sets.

DETAILED DESCRIPTION OF THE PREFERRED EMBODIMENTS

Figure 1:
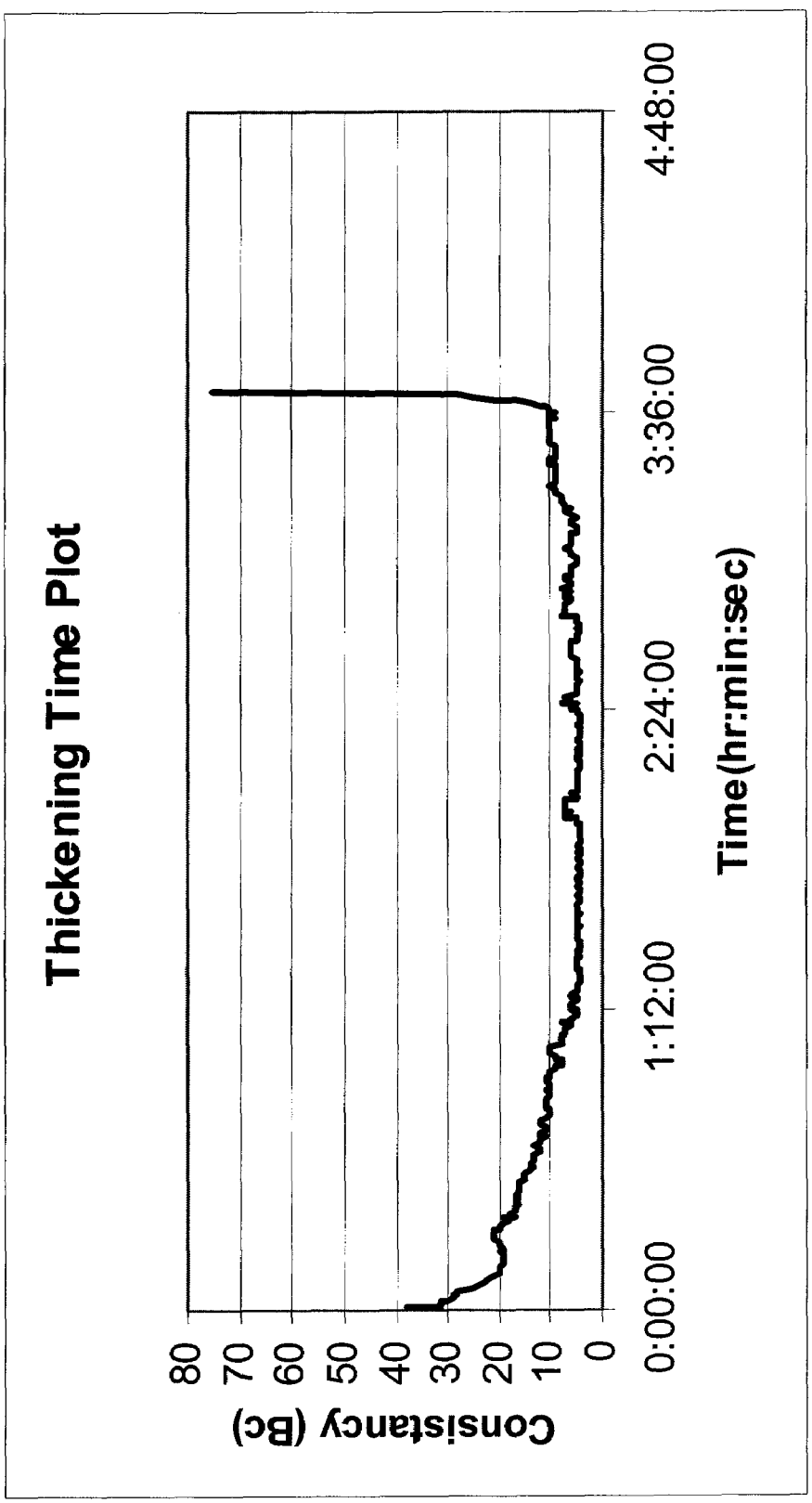
FIG. 1 is a plot of thickening time for a cement composition.

Cement compositions or slurries may include at least one water soluble aromatic sulfonated polymer for reducing the transition times of the compositions. As used herein, the transition time of a cement composition is defined as the period of time after the composition is placed into a wellbore annulus during which the pressure exerted on the subterranean formation by the cement composition is less than the pressure of the gas in the formation such that gas migration into the composition can occur. The transition time is typically the time ranging from when the gel strength of the composition is about 100 lb$_f$/100 ft$^2$ to when it is about 500 lb$_f$/100 ft$^2$. Due to the presence of the aromatic sulfonated polymer in the cement compositions, the transition times of the compositions are typically less than or equal to about 60 minutes, alternatively less than or equal to about 50 minutes, alternatively less than or equal to about 40 minutes, alternatively less than or equal to about 30 minutes, alternatively less than or equal to about 20 minutes, or alternatively less than or equal to about 10 minutes. As a result, a cement composition may be pumped to its desired location in a wellbore, e.g., the annulus, and allowed to set without being concerned that gas migration could compromise its ability to seal an area of the wellbore. That is, there is insufficient time for the gas to migrate into and through the cement composition and form flow channels therein. The water soluble aromatic sulfonated polymer thus serves as a gas migration control additive in the cement compositions.

As illustrated in the examples below, the cement compositions also exhibit a relatively constant viscosity for a period of time after they are initially prepared and while they are being placed in their intended locations in the wellbore. Eventually, the cement compositions quickly set such that the viscosity increases to equal to higher than above 70 Bearden units of Consistency (Bc) from about 35 Bearden units (Bc) in less than about 60 minutes. In an embodiment, the viscosity increases to its maximum in less than about 10 minutes. This sudden jump in viscosity is very desirable in preventing the gas migration because it indicates the quick formation of impermeable mass from a gelled state after placement. This behavior is often referred to as "Right Angle Set" and such cement compositions are called "Right Angle Set Cement Compositions." In contrast, the viscosity of conventional cement compositions typically increases gradually over time to its maximum value.

Any suitable water soluble aromatic sulfonated polymer known in the art operable to provide the desired properties described herein may be employed in the cement compositions. In one embodiment, an aromatic sulfonated polymer comprises a polymeric backbone having sulfonated (i.e., salts of sulfonic acid functional groups) aromatic rings as pendant groups. Examples of such aromatic rings include phenyl rings, naphthyl, anthracenyl or phenanthrenyl rings. Examples of suitable aromatic sulfonated polymers include but are not limited to compounds having one of chemical Structures A-F where M is H, alkali or alkaline earth metal, or ammonium; partially or completely sulfonated polystyrenes such as those having Structure B; poly(styrene sulfonic acid) such as those having Structure A and its alkali or alkaline earth metal or ammonium salts where M=H, alkali or alkaline earth metal, or ammonium; polymers obtained by polymerizing monomers comprising allyloxybenzenesulfonic acid (structure not shown); copolymers of styrene and sulfonated styrene such as those having Structure B; sulfonated gilsonites; sulfonated lignin; copolymers comprising sulfonated styrene, sulfonated alpha-methylstyrene, sulfonated vinyl toluene and the like; and combinations thereof. In some embodiments such aromatic sulfonated polymers may contain small amounts other comonomers such as maleic anhydride, acrylic acid, AMPS (2-acrylamido-2-methyl-1-propane sulfonic acid), methallysulfonic acid, or combinations thereof. Such additional monomers may be present in less than 10 molar percent of the monomer content of the aromatic sulfonated polymer. Of these poly(styrene sulfonic acid) and its alkali metal salts are preferred. Suitable commercially available water soluble aromatic sulfonated polymers include VERSA-TL 130, VERSA-TL-501, VERSA-TL 130, VERSA-TL 77, VERSA-TL 70, VERSA-TL 501 from ALCO Chemical, a division of National Starch and Chemical Company, Chattanooga, Tenn., SOLTEX SHALE INHIBITOR from Drilling Specialties Company, The Woodlands, Tex., and BOREMASTER from Setac Chemical Corporation, Lafayette, La. In an embodiment, water soluble aromatic sulfonated compounds may contain the sulfonated aromatic ring as part of the polymer back bone. Such aromatic sulfonated polymers may comprise a linear polymer containing three kinds of unit bonds, i.e., an arylene bond, an ether bond, and a sulfone bond. Examples of such aromatic sulfonated polymers include those represented by the following Structures C-F. It is not necessary that all the aromatic rings are sulfonated in the polymers containing the aromatic rings as part of the polymer back bone. The degree of sulfonation is such that the whole polymer becomes water soluble either in the acid form or when converted to an alkali or alkaline earth metal or ammonium salt. For the purpose of the present invention, a sulfonated polymer with solubility of greater than 1% in cement composition at ambient temperature is considered water soluble.

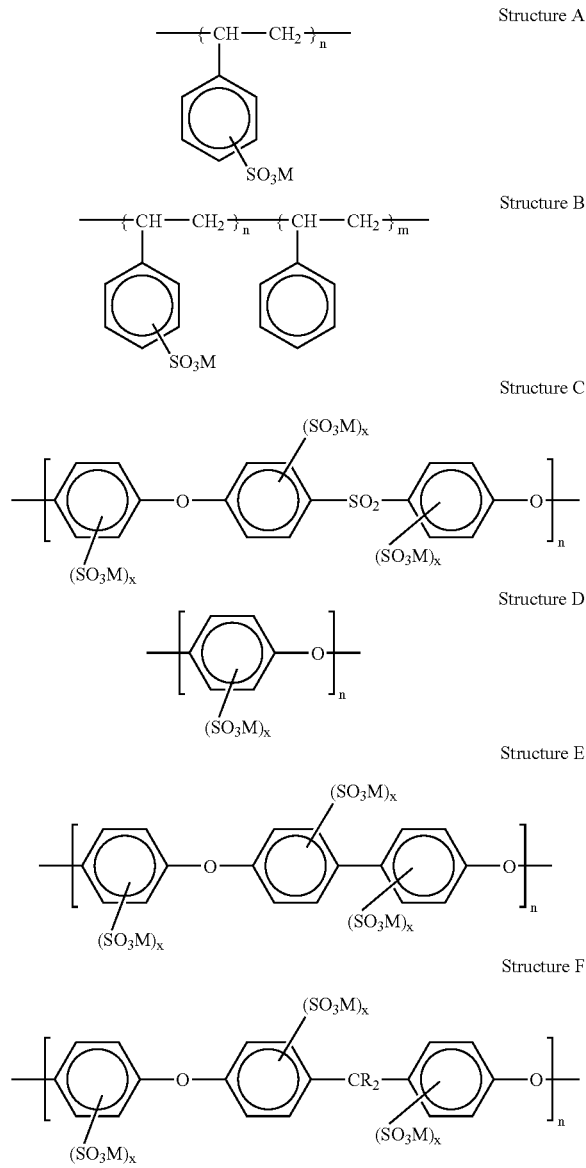

Structure A

Structure B

Structure C

Structure D

Structure E

Structure F

The aromatic sulfonated polymers of the present invention are compatible with other components commonly used in cement compositions. The amount of aromatic sulfonated polymer present in the cement composition may be in a range of from about 0.1% to about 5%, from about 1.1% to about 2%, or from about 1.2% to about 1.5%, all percentages being by weight of the cement (bwoc).

The cement compositions may further include cement such as hydraulic cement, which includes calcium, aluminum, silicon, oxygen, and/or sulfur and which sets and hardens by reaction with water. Examples of hydraulic cements include but are not limited to a Portland cement, a pozzolan cement, a gypsum cement, a high alumina content cement, a silica cement, a high alkalinity cement, and combinations thereof. The cement may be, for example, a API Class A, C, G, or H Portland cement. In an embodiment, ultrafine particle cement (mean particle size equal to less than 5 microns) may be used. A sufficient amount of water may also be added to the cement to form a pumpable cementitious slurry. The water may be fresh water or salt water, e.g., an unsaturated aqueous salt solution or a saturated aqueous salt solution such as brine or seawater. The water may be present in the amount of 30% to 150% by weight of cement preferably in 40% to 110% by weight of cement.

In an embodiment, the cement the cement compositions may also include a high temperature strength retainment additive such as silica flour, which is commercially available from Halliburton Energy Services, Inc. under the tradename of SSA-1. Other high temperature strength retaining materials include silica materials, SILICALITE, SSA-2, and MICROSAND available from Halliburton Energy Services, Inc. Such materials may be used in amounts ranging from 5% to 45% by weight of cement.

In another embodiment, the cement compositions may additionally include a set retarder to increase the time required for the cement composition to set and thus provide a sufficient amount of time for the composition to be properly placed in the wellbore. Examples of suitable set retarders include, but are not limited to, lignosulfonate such as HR-5, a synthetic copolymer such as SCR-100, SCR-500, an organic acid retarder such as HR-25, carboxymethyhydroxyethyl cellulose, DIACEL LWL all commercially available from Halliburton Energy Services, Inc., and combinations thereof. Such retarders or suitable combinations of retarders may be used in amounts of 0.1% to about 3% by weight of cement depending on the temperature of application. In an embodiment, an amount of such retarders is added that is effective to retain fluidity and pumpability of cement slurries for 2-6 hrs under down hole conditions.

As deemed appropriate by one skilled in the art, additional additives may be added to the cement compositions for improving or changing the properties thereof. Examples of such additives include but are not limited to fluid loss control agents such as those sold under the brand HALAD by Halliburton Energy Services, Inc., defoamers, light weight additives such as glass or flyash spheres, fumed silica and Class F flyash, dispersing agents, weighting agents, foaming surfactants, and formation conditioning agents.

The foregoing cement compositions may be made by combining all of the components in any order and thoroughly mixing the components in a manner known to one skilled in the art. In an embodiment, the aromatic sulfonated polymer is available in an aqueous solution and is thus combined with the water before it is mixed with the cement to form a pumpable slurry. In an alternative embodiment, the aromatic sulfonated polymer is available as solid particles and is thus combined with the cement before water is introduced to the cement.

The foregoing cement compositions may be used in various cementing operations performed in a wellbore. In one embodiment, the cement compositions may be employed in primary cementing. Primary cementing first involves drilling a wellbore to a desired depth such that the wellbore penetrates a subterranean formation while circulating a drilling fluid through the wellbore. Subsequent to drilling the wellbore, at least one conduit such as a casing may be placed in the wellbore while leaving a space known as the annulus between the wall of the conduit and the wall of the wellbore. The drilling fluid may then be displaced down through the conduit and up through the annulus one or more times, for example, twice, to clean out the hole. A cement composition then may be conveyed downhole and up through the annulus, thereby displacing the drilling fluid from the wellbore. As discussed previously, the transition time of the cement composition is relatively short such that little or no gas migration into the composition can occur. The cement composition then quickly sets into an impermeable mass, forming a cement column that isolates an adjacent portion of the subterranean formation and provides support to the adjacent conduit.

In another embodiment, the cement compositions may be employed in a secondary cementing operation such as squeeze cementing, which is performed after the primary cementing operation. In squeeze cementing, a cement composition is forced under pressure into permeable zones through which fluid can undesirably migrate in the wellbore. Examples of such permeable zones include fissures, cracks, fractures, streaks, flow channels, voids, high permeability streaks, annular voids, or combinations thereof. The permeable zones may be present in the cement column residing in the annulus, a wall of the conduit in the wellbore, a microannulus between the cement column and the subterranean formation, and/or a microannulus between the cement column and the conduit. The transition time of the cement composition is relatively short such that the amount of gas migration into the composition is limited. The cement composition is allowed to set within the permeable zones, thereby forming an impermeable mass to plug those zones and prevent fluid from leaking therethrough.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner. In the following examples, the cement compositions were prepared and tested in accordance with procedures described in the American Petroleum Institute (API) Specification 10A, $23^{rd}$ Edition, April 2002.

Example 1

Three cement compositions or slurries were prepared that contained different concentrations or types of aromatic sulfonated polymer, as shown below in Table 1. In particular, two of the cement compositions contained different concentrations of sulfonated polystyrene-A, and one contained sulfonated polystyrene-B. The sulfonated polystyrene-A and sulfonated polystyrene-B had different molecular weights as shown in Table 3. Sulfonated polystyrenes A, B and C were obtained ALCO Chemical, a Division of National Starch and Chemical Company. For each cement composition, the following components were blended with the aromatic sulfonated polymer: 100% class H cement, 48.3% water, 40% SSA-1 strength retainment additive, 45% HR-5 set retarder, and 0.25% HR-25 set retarder, all percentages being by weight of the cement. The liquid additives were added with mix water whereas solid additives were dry blended with cement.

As presented in Table 1 below, the rheology behavior of each slurry was tested at a temperature of 80° F. and atmospheric pressure using a FANN 35 viscometer.

Comparative Example 1

The same procedure followed in Example 1 was used to make and test a control cement composition containing a currently used gas migration control additive GASSTOP HT made from tannin grafted with acrylate monomers, which is commercially available from Halliburton Energy Services, Inc. Table 1 below also shows the results of the rheology test performed on this control cement composition.

TABLE 1

| Additive | GASSTOP HT (control) | Sulfonated Polystyrene-A | Sulfonated Polystyrene-A | Sulfonated Polystyrene-B |
|---|---|---|---|---|
| Concentration, % bwoc | 1.1 | 1.1 | 0.55 | 1.1 |
| FANN 35 viscometer readings, centipoise | | | | |
| @ 600 rpm | 347+ | 347+ | 347+ | 347+ |
| @ 300 rpm | 347+ | 347+ | 242 | 300 |
| @ 200 rpm | 324 | 230 | 167 | 192 |
| @ 100 rpm | 202 | 144 | 89 | 96 |
| @ 30 rpm | 106 | 77 | 28 | 29 |
| @ 6 rpm | 24 | 17 | 5.6 | 6.5 |
| @ 3 rpm | 13 | 9 | 2.7 | 3.2 |

Based on the results in Table 1, the cement compositions containing the aromatic sulfonated polystyrene exhibited rheology behavior comparable to that of the GASSTOP HT gas migration control additive.

Example 2

Four cement compositions or slurries were prepared that contained different amounts or types of aromatic sulfonated polymer, as shown below in Table 2. In particular, two of the cement compositions contained different concentrations of sulfonated polystyrene-A, one contained sulfonated polystyrene-B, and one contained sulfonated gilsonite such as BORE MASTER from Setac Chemical Corporation, Lafayette, La.; or SOLTEX from Drilling Specialties Company, The Woodlands, Tex. For each cement composition, the following components were blended with the aromatic sulfonated polymer: 100% class H cement, 48.3% water, 40% SSA-1 strength retainment additive, 45% HR-5 set retarder, and 0.25% HR-25 set retarder, all percentages being by weight of the cement. Liquid additives were added with mix water whereas solid additives were dry blended with cement.

The thickening time required for each cement composition to achieve 70 Bearden units of consistency (Bc) was determined while continuously shearing the composition. While maintaining the cement composition in a static state, the time required for the viscosity to change from 35 Bc to 100 Bc was also determined. The thickening time indicates conversion of pumpable fluid state to a non-pumpable paste. The time lapse between 35 Bc to 100 Bc is also often considered as a measure of transition time indicating the viscosity change to form an impermeable solid mass from a gelled state. Moreover, the transition time required for the cement composition to change from having a static gel strength of 100 lb$_f$/100 ft$^2$ to having a static gel strength of 500 lb$_f$/100 ft$^2$ was determined at 300° F. and 10,000 psi using MINIMACS equipment supplied by Halliburton Energy Services, Inc. and described in more detail in Example 3.

The results of these thickening time and transition time tests are shown in Table 2 below. FIG. 1 is a plot of thickening time for the cement composition comprising 1.1\5 bwoc sulfonated polystyrene-A at 300° F. and 10,000 psi.

Comparative Example 2

The same procedure followed in Example 2 was used to make and test a control cement composition containing GASSTOP HT gas migration control additive. Table 2 below also shows the results of the rheology test performed on this control cement composition.

TABLE 2

| Additive | Concentration, % bwoc | Thickening time to reach 70 Bc | Time to change from 35 Bc to 100 Bc | Transition time 100 lb$_f$/100 ft$^2$ to 500 lb$_f$/100 ft$^2$ |
|---|---|---|---|---|
| GASSTOP HT (control) | 1.1 | 6 hrs. | 9 min. | 50-60 min. |
| Sulfonated Polystyrene-A | 1.1 | 3 hrs. 40 min. | 2 min. | 10 min. |
| Sulfonated Polystyrene-A | 0.55 | 3 hrs. 42 min. | 2 min. | Not Available |
| Sulfonated Polystyrene-B | 1.1 | 4 hrs. 55 min. | 5 min. | Not Available |
| Sulfonated Gilsonite | 0.5 | Not Available | Not Available | 8 min. |

Based on the results depicted in Table 2, the sulfonated polystyrene-containing compositions and the sulfonated gilsonite-containing compositions exhibited much shorter times, required to change viscosity from 35 Bc to 100 Bc, and shorter transition times than the control cement composition containing a prior art material. Increasing the amount of sulfonated polystyrene-A used in the cement compositions did not affect the thickening time. As such, the polystyrene-A probably did not significantly affect the thickening time while the GLASSTOP HT additive probably retarded the thickening time. The sulfonated polystyrene and sulfonated gilsonite surprisingly had transitions times as low as 10 minutes and 8 minutes, respectively. Accordingly, such aromatic sulfonated polymers could serve as excellent gas migration control additives in cement compositions.

Example 3

Three cement compositions or slurries were prepared that contained different types of aromatic sulfonated polymers, as shown below in Table 3. In particular, the three cement compositions contained sulfonated polystyrene-A, sulfonated polystyrene-B, and sulfonated polystyrene-C, respectively. The molecular weights of these different sulfonated polystyrene materials are also shown in Table 3. For each cement composition, the following components were blended with 1.1% of the sulfonated polystyrene material: 100% class H cement, 35% SSA-1 strength retainment additive, 0.45% HR-5 set retarder, 0.25% HR-25 set retarder, and an effective amount of water to maintain a slurry density of 16.7 pounds per gallon, all percentages being by weight of the cement. The liquid additives were added with mix water whereas solid additives were dry blended with cement.

The transition time required for each cement composition to change from having a static gel strength of 100 $lb_f/100$ $ft^2$ to having a static gel strength of 500 $lb_f/100$ $ft^2$ was determined. Further, the time required to reach 100 $lb_f/100$ $ft^2$ (referred to as Zero Gel Time) of each cement composition was determined according to the following procedure using a "MINIMACS" Instrument at 300° F. and 10,000 psi.

The static gel strength development test requires specialized equipment, such as the MACS Analyzer or the MINI-MACS Analyzer. This equipment measures the shear resistance of a cement slurry under downhole temperature and pressure while the cement remains essentially static. The test is conducted by mixing the slurry and placing into the specialized testing device. The slurry is then stirred and heated to BHCT and downhole pressure according to the same schedule as the thickening time test. After the slurry reaches the BHCT, stirring is stopped and the slurry is allowed to essentially remain static. The stirring paddle is rotated at a rate of about 0.5°/min while the shear resistance on the paddle is measured. The shear resistance is correlated to the SGS (units are lb/100 $ft^2$) and a plot of SGS development is made as a function of time.

Per the above test procedure, the "Zero Gel Time" is defined as the "time" the slurry takes to reach a static gel strength of 100 $lb_f/100$ $ft^2$ once the stirring is stopped and allowed to remain static. As illustrated in Table 3 below, the cement compositions containing the sulfonated polystyrene materials exhibited low transition times of less than or equal to 40 minutes.

TABLE 3

| Additive | Molecular Weight | Zero Gel Time (min.) | Transition Time (min.) |
| --- | --- | --- | --- |
| Sulfonated Polystyrene-A | 75,000 | 50 | 40 |
| Sulfonated Polystyrene-B | 200,000 | 60 | 30 |
| Sulfonated Polystyrene-C | 1,000,000 | 40 | 40 |

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A cement composition comprising cement and a water-soluble aromatic sulfonated polymer for inhibiting gas migration into the cement composition during a transition time of the cement composition, wherein the water-soluble aromatic sulfonated polymer comprises a polymeric backbone having sulfonated aromatic rings as pendant groups or a sulfonated aromatic ring as part of a polymeric backbone and wherein the water-soluble aromatic sulfonated polymer comprises a comonomer selected from the group consisting of maleic anhydride, acrylic acid, AMPS, methallysulfonic acid, and combinations thereof which is present in an amount of less than about 10 molar percent and wherein the transition time is less than or equal to about 60 minutes.

2. The cement composition of claim 1, wherein the transition time is less than or equal to about 10 minutes.

3. The cement composition of claim 1, wherein the cement composition develops a compressive strength of greater than about zero in less time than the similar cement composition having comparable thickening time and lacking a water-soluble aromatic sulfonated polymer.

4. The cement composition of claim 1, wherein the cement composition has a reduced occurrence of false set than a similar cement composition lacking a water-soluble aromatic sulfonated polymer.

5. The cement composition of claim 1, wherein the cement composition has a zero gel time greater than a similar cement composition lacking a water-soluble aromatic sulfonated polymer.

6. The cement composition of claim 1, wherein the cement composition displays a right angle set.

7. The cement composition of claim 1 having a viscosity that increases from being about constant for a period of time after the cement composition is prepared to a maximum value in less than about 60 minutes when the cement composition sets.

8. The cement composition of claim 1, wherein the viscosity of the cement composition increases from about 35 Bc to equal to or higher than about 70 Bc in about 60 minutes or less when the cement composition sets.

9. The cement composition of claim 1, wherein the water-soluble aromatic sulfonated polymer comprises a polymeric backbone having sulfonated aromatic rings as pendant groups, wherein the polymeric backbone does not contain any sulfonated aromatic rings.

10. The cement composition of claim 1, wherein the water-soluble aromatic sulfonated polymer comprises a polymeric backbone containing sulfonated aromatic rings, wherein the polymeric backbone does not contain any sulfonated aromatic rings as pendant groups.

11. The cement composition of claim 1, wherein the water-soluble aromatic sulfonated polymer comprises one or more compounds having one of chemical Structures A-F:

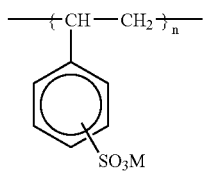

Structure A

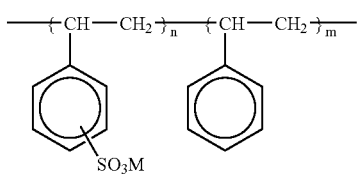

Structure B

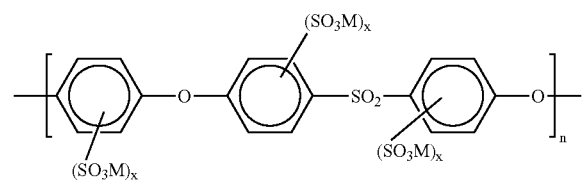

Structure C

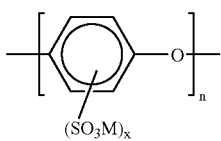

Structure D

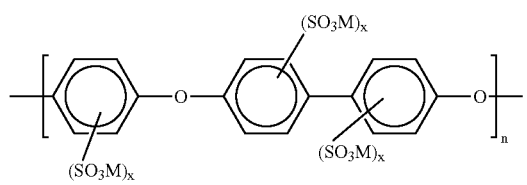

Structure E

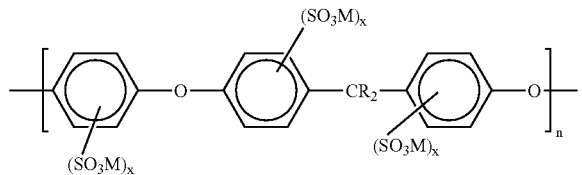

Structure F wherein n, m, and x are integers, $R_2$ is a hydrocarbyl group, and M is hydrogen, an alkali or alkaline earth metal, ammonium, or combinations thereof.

12. The cement composition of claim 1, wherein the water-soluble aromatic sulfonated polymer comprises alkali metal salts of poly(styrene sulfonic acid).

13. The cement composition of claim 1, wherein the water-soluble aromatic sulfonated polymer comprises partially or fully sulfonated polystyrene; poly(styrene sulfonic acid); a copolymer of styrene and sulfonated styrene; sulfonated gilsonite; sulfonated lignin; a copolymer comprising sulfonated styrene, sulfonated alpha-methylstyrene, allyloxy-benzenesulfonic acid, or sulfonated vinyl toluene; or combinations thereof.

14. The cement composition of claim 1, wherein the sulfonated aromatic rings comprise a phenyl group, a naphthyl group, a anthracenyl group, a phenanthrenyl group, or combinations thereof.

15. The cement composition of claim 1, wherein the polymeric backbone comprises a plurality of monomers each containing a plurality of sulfonated aromatic rings.

16. The cement composition of claim 1, wherein the polymeric backbone comprises a plurality of monomers each containing an arylene bond, an ether bond, a sulfone bond, or combinations thereof.

17. The cement composition of claim 1, wherein an amount of the water-soluble aromatic sulfonated polymer present in the cement composition may be in a range of from about 0.1% to about 5% by weight of the cement.

18. The cement composition of claim 1, wherein the cement composition further comprises a defoamer.

19. The cement composition of claim 1 wherein the water-soluble sulfonated aromatic polymer has a molecular weight of from about 75,000 Daltons to about 1,000,000 Daltons.

20. The cement composition of claim 1 having a zero gel time of equal to or greater than about 40 minutes.

* * * * *